(12) United States Patent
    Chen (10) Patent No.: US 10,759,385 B2
(45) Date of Patent: Sep. 1, 2020

(54) ELECTRONIC LOCK AND KEY FOR PERFORMING AN UNLOCK OPERATION

(71) Applicant: TENCENT TECHNOLOGY (SHENZHEN) COMPANY LIMITED, Shenzhen (CN)

(72) Inventor: Jie Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/207,066

(22) Filed: Nov. 30, 2018

(65) Prior Publication Data

US 2019/0100166 A1    Apr. 4, 2019

Related U.S. Application Data

(63) Continuation of application No. PCT/CN2017/093638, filed on Jul. 20, 2017.

(30) Foreign Application Priority Data

Jul. 20, 2016    (CN) .......................... 2016 1 0576420

(51) Int. Cl.
    *B60R 25/24*    (2013.01)
    *H04W 12/00*    (2009.01)
    (Continued)

(52) U.S. Cl.
    CPC ............ *B60R 25/24* (2013.01); *B60R 25/252* (2013.01); *G07C 9/00182* (2013.01);
    (Continued)

(58) Field of Classification Search
    CPC . B60R 2325/108; B60R 25/24; B60R 25/252; B60R 25/30; G07C 2009/00095;
    (Continued)

(56) References Cited

U.S. PATENT DOCUMENTS

| | | | | |
|---|---|---|---|---|
| 3,906,447 | A * | 9/1975 | Crafton .............. | G07C 9/00571 235/382.5 |
| 2002/0034321 | A1* | 3/2002 | Saito ....................... | G07C 9/27 382/124 |

(Continued)

FOREIGN PATENT DOCUMENTS

| | | |
|---|---|---|
| CN | 104299295 | 1/2015 |
| CN | 104952128 | 9/2015 |

(Continued)

OTHER PUBLICATIONS

International Search Report dated Oct. 11, 2017 in PCT/CN2017/093638 filed Jul. 20, 2017 (With English Translation) p. 1-6.

(Continued)

*Primary Examiner* — Omer S Khan
(74) *Attorney, Agent, or Firm* — Oblon, McClelland, Maier & Neustadt, L.L.P.

(57) ABSTRACT

An electronic unlocking system includes an electronic lock and an electronic key. The electronic key includes processing circuitry and transmission circuitry. The processing circuitry is configured to obtain at least one piece of feature data when an unlock operation is triggered. The at least one piece of feature data includes data representing a user that triggers the unlock operation. The processing circuitry is configured to encrypt the obtained at least one piece of feature data to obtain encrypted data. The transmission circuitry is configured to send the encrypted data to the electronic lock to cause the electronic lock to execute the unlock operation.

20 Claims, 7 Drawing Sheets

(51) Int. Cl.
    *B60R 25/25*      (2013.01)
    *H04W 12/06*      (2009.01)
    *G07C 9/00*      (2020.01)
    *B60R 25/30*      (2013.01)
    *H04L 29/06*      (2006.01)
    *G07C 9/26*      (2020.01)

(52) U.S. Cl.
    CPC ..... *G07C 9/00563* (2013.01); *G07C 9/00944* (2013.01); *H04W 12/001* (2019.01); *H04W 12/06* (2013.01); *H04W 12/0608* (2019.01); *B60R 25/30* (2013.01); *B60R 2325/108* (2013.01); *G07C 9/26* (2020.01); *G07C 2009/00412* (2013.01); *H04L 63/0861* (2013.01); *H04L 2463/062* (2013.01); *H04W 12/00407* (2019.01); *H04W 12/00502* (2019.01); *H04W 12/00504* (2019.01)

(58) Field of Classification Search
    CPC ...... G07C 2009/00412; G07C 9/00182; G07C 9/00563; G07C 9/00944; H04W 12/001; H04W 12/0608
    See application file for complete search history.

(56) References Cited

U.S. PATENT DOCUMENTS

| | | | |
|---|---|---|---|
| 2003/0001723 A1 | 1/2003 | Masudaya | |
| 2003/0014649 A1* | 1/2003 | Funahashi | G07C 9/00087 713/186 |
| 2004/0021552 A1* | 2/2004 | Koo | G07C 9/00087 340/5.53 |
| 2009/0079540 A1* | 3/2009 | Grafeev | G06F 21/32 340/5.83 |
| 2015/0015367 A1 | 1/2015 | Lin | |
| 2015/0187152 A1* | 7/2015 | Matsushima | G07C 9/28 340/5.61 |
| 2016/0078274 A1* | 3/2016 | Tuneld | G06K 9/0002 382/124 |
| 2016/0180618 A1* | 6/2016 | Ho | G07C 9/00563 340/5.52 |
| 2016/0277925 A1* | 9/2016 | Bengtsson | H04L 63/107 |

FOREIGN PATENT DOCUMENTS

| | | |
|---|---|---|
| CN | 105096430 | 11/2015 |
| CN | 204883882 | 12/2015 |
| CN | 105551118 | 5/2016 |
| CN | 105574963 | 5/2016 |
| CN | 105701896 | 6/2016 |
| EP | 0983916 | 3/2000 |
| JP | 2008227789 | 9/2008 |
| WO | 9956429 | 11/1999 |

OTHER PUBLICATIONS

Written Opinion dated Oct. 11, 2017 in PCT/CN2017/093638 filed Jul. 20, 2017 p. 1-3.
Office Action dated Aug. 28, 2019 in Chinese Patent Application No. 201610576420.3 (With Concise English Translation).

* cited by examiner

ELECTRONIC LOCK AND KEY FOR PERFORMING AN UNLOCK OPERATION

RELATED APPLICATION

This application is a continuation of International Application No. PCT/CN2017/093638, filed on Jul. 20, 2017, which claims priority to Chinese Patent Application No. 201610576420.3, entitled "DATA PROCESSING METHOD AND DEVICE, AND SYSTEM" filed with the Patent Office of China on Jul. 20, 2016. The entire disclosures of the prior applications are hereby incorporated by reference in their entirety.

FIELD OF THE TECHNOLOGY

The present disclosure relates to the field of computer technologies.

BACKGROUND OF THE DISCLOSURE

Locks and keys are objects very familiar to people in daily life. Locks have various types, but always have paired keys for unlocking.

With the progress of sciences and technologies, locks and keys have long been out of mechanical correspondence. By using a car as an example, car unlocking may be implemented when a key is still a particular distance away from the car. The principle of car unlocking is that after a user presses an electronic key of the car, the electronic key transmits a radio frequency signal, a sensing apparatus in a car lock can identify the radio frequency signal corresponding thereto, and start an unlock operation.

In the related technology, the manner of unlocking by using an electronic key within a particular distance is widely used, but the security is not good. Now the event of opening a car by using a decoder for theft frequency occurs. Therefore, to improve the security of unlocking by using an electronic key within a particular distance becomes the problem demanding urgent solution.

SUMMARY

To resolve the problem of security of unlocking by using an electronic key in the related technology, an embodiment of the present disclosure provides a data processing method. In the unlock process, not only decryption needs to be first performed, but also at least one piece of decrypted feature data needs to match, so that the unlock operation is executed, thereby improving the security of unlocking by using the electronic key. Embodiments of the present invention further provide a corresponding device and system.

A first aspect of the embodiments of the present disclosure provides an electronic key. The electronic key includes processing circuitry and transmission circuitry. The processing circuitry is configured to obtain at least one piece of feature data when an unlock operation is triggered. The at least one piece of feature data includes data representing a user that triggers the unlock operation. The processing circuitry is configured to encrypt the obtained at least one piece of feature data to obtain encrypted data. The transmission circuitry is configured to send the encrypted data to the electronic lock to cause the electronic lock to execute the unlock operation.

A second aspect of the embodiments of the present disclosure provides an electronic lock. The electronic lock includes receiver circuitry and processing circuitry. The receiver circuitry is configured to receive encrypted data from an electronic key. The encrypted data includes at least one piece of feature data that is obtained by the electronic key when an unlock operation is triggered. The at least one piece of feature data includes data representing a user that triggers the unlock operation. The processing circuitry is configured to decrypt the received encrypted data to obtain the at least one piece of feature data, determine whether the at least one piece of feature data matches predetermined feature data, and execute the unlock operation when the at least one piece of feature data is determined to match the predetermined feature data.

According to a third aspect of the embodiments of the present disclosure, there is provided an electronic unlocking system that includes an electronic key and an electronic lock. The electronic key includes first processing circuitry and transmission circuitry. The first processing circuitry is configured to obtain at least one piece of feature data when an unlock operation is triggered. The at least one piece of feature data includes data of a user that triggers the unlock operation. The processing circuitry is configured to encrypt the obtained at least one piece of feature data to obtain encrypted data. The transmission circuitry is configured to send the encrypted data to the electronic lock. The electronic lock includes receiver circuitry and second processing circuitry. The receiver circuitry is configured to receive the encrypted data from the electronic key. The second processing circuitry is configured to decrypt the received encrypted data to obtain the at least one piece of feature data, determine whether the at least one piece of feature data matches predetermined feature data, and execute the unlock operation when the at least one piece of feature data is determined to match the predetermined feature data.

Compared with poor security of unlocking by using an electronic key in the related technology, according to the data processing method provided in the embodiments of the present disclosure, in the unlock process, not only decryption needs to be first performed, but also at least one piece of decrypted feature data needs to match, so that the unlock operation is executed, thereby improving the security of unlocking by using the electronic key.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show only some embodiments of the present disclosure, and a person skilled in the art may still derive other drawings from these accompanying drawings.

DESCRIPTION OF EMBODIMENTS

An embodiment of the present disclosure provides a data processing method. In the unlock process, not only decryption needs to be first performed, but also at least one piece of decrypted feature data needs to match, so that the unlock operation is executed, thereby improving the security of unlocking by using an electronic key. Embodiments of the present disclosure further provide a corresponding device and system. Detailed descriptions are separately provided below.

The following describes the technical solutions in the embodiments of the present disclosure with reference to the accompanying drawings in the embodiments of the present disclosure. The described embodiments are some of the embodiments of the present disclosure rather than all of the embodiments. All other embodiments obtained by a person skilled in the art based on the embodiments of the present disclosure shall fall within the protection scope of the present disclosure.

Locks and keys include mechanical and electronic types. The electronic types further include direct contact types and indirect contact types.

Locks and keys of mechanical types need to directly contact each other during unlocking, and unlocking can be implemented by corresponding serrations and then rotating.

Locks and keys of direct contact types, for example, implement unlocking by directly swiping an electronic key on an electronic lock, such as access control card swiping.

In locks and keys of indirect contact types, for example, an electronic key is pressed to transmit an unlock signal to an electronic lock, and the electronic lock identifies the signal to implement unlocking, such as remote control unlocking of a car. Certainly, electronic locks and electronic keys of this indirect contact type are not limited to application to the aspect of remote control unlocking of a car. The solutions provided in the embodiments of the present disclosure can be used provided that indirect contact type contact between an electronic key and an electronic lock is relied on.

Currently, the security of the electronic locks and electronic keys of the indirect contact type is poor. Therefore, an embodiment of the present disclosure provides a data processing method, so as to improve the security of unlocking of the electronic locks and electronic keys of the indirect contact type.

Figure 1:
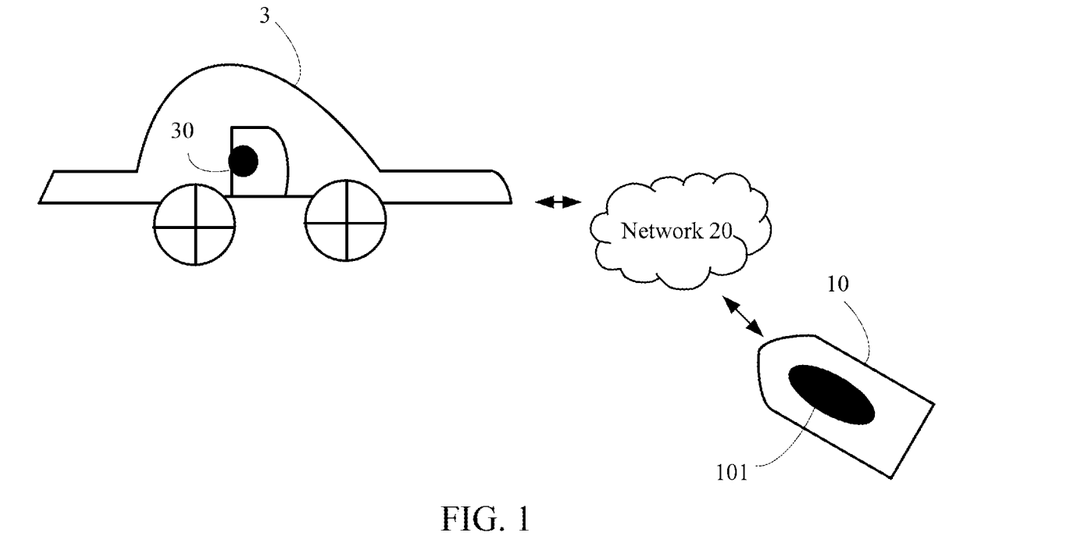
FIG. 1 is a schematic diagram of an embodiment of an electronic unlocking system according to an embodiment of the present disclosure.

Referring to FIG. 1, an embodiment of an electronic unlocking system according to an embodiment of the present disclosure includes an electronic key 10, a network 20, an electronic lock 30, and a car 3. The electronic lock 30 is mounted on the car 3. The electronic key 10 and the electronic lock 30 are wirelessly communicatively connected to each other by using the network 20. In the scenario shown in FIG. 1, the electronic lock 30 is mounted on the car 3. Actually, the electronic unlocking system is not limited to the use scenario of a car, and also can be used in a scenario such as a remote control lock mounted on a door. FIG. 1 is described by using the scenario merely as an example, and should not be considered as a limitation to the use scenario.

When a user needs to perform unlocking, the user triggers an unlock operation by using the electronic key 10, such as pressing a sensing area 101 on the electronic key 10. After the user triggers the unlock operation, the electronic key 10 obtains at least one piece of feature data when the unlock operation is triggered, the at least one piece of feature data including data for representing a user that triggers the unlock operation. The electronic key 10 encrypts the at least one piece of feature data to obtain encrypted data. The electronic key sends the encrypted data to the electronic lock.

The electronic lock 30 receives the encrypted data sent by the electronic key. The electronic lock 30 decrypts the encrypted data to obtain at least one piece of decrypted feature data. The electronic lock matches the at least one piece of decrypted feature data against corresponding feature data on the electronic lock side. When the matching is successful, the electronic lock 30 executes the unlock operation.

The foregoing is overall description of the unlocking process of the electronic unlocking system. The functions and the steps of the electronic key 10 and the electronic lock 30 in the unlock process are respectively described below.

Figure 2:
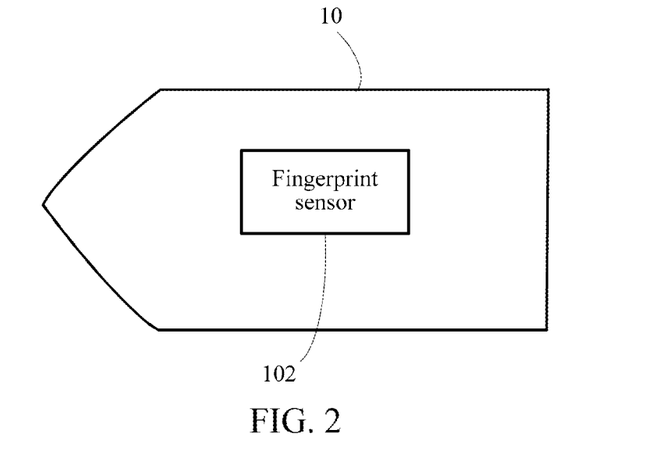
FIG. 2 is a schematic structural diagram of an electronic key according to an embodiment of the present disclosure.

FIG. 2 is a schematic structural diagram of an electronic key 10 according to an embodiment of the present disclosure.

As shown in FIG. 2, the electronic key 10 includes a fingerprint sensor 102. The fingerprint sensor 102 may obtain, when a user presses a sensing area 101 of the electronic key 10 shown in FIG. 1, fingerprint data of the user that triggers an unlock operation. If the electronic key 10 obtains, when the unlock operation is triggered, only the fingerprint data of the user that triggers the unlock operation, the electronic key 10 needs only to encrypt the fingerprint data to obtain encrypted data.

Correspondingly, after receiving the encrypted data in which only the fingerprint data is encrypted, an electronic lock 30 performs decryption according to a decryption algorithm corresponding to an algorithm used in the encryption process of the electronic key 10. If the decryption is successful, the fingerprint data of the user that triggers the unlock operation is obtained.

The electronic lock 30 prestores fingerprint data of a car owner or a user that frequently uses the car. The prestored fingerprint data may be collected from an operating component (such as a steering wheel) of a car 3 and prestored in a memory. Then, the electronic lock 30 matches the fingerprint data of the user that triggers the unlock operation against the prestored fingerprint data. If a similarity between the fingerprint data is greater than a first preset threshold after the matching, it is confirmed that the matching is successful. For example, the first preset threshold, for example, may be 90%, and if the similarity exceeds 90%, it is considered that the matching is successful, and the unlock operation is executed.

In this embodiment of the present disclosure, by means of fingerprint matching, a person picking up the electronic key of the car can be effectively prevented from unlocking the electronic lock of the car, thereby improving the security of unlocking.

Figure 3:
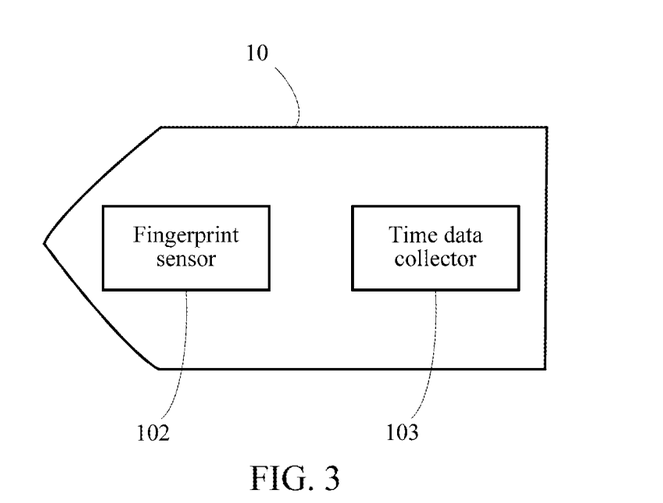
FIG. 3 is another schematic structural diagram of an electronic key according to an embodiment of the present disclosure.

FIG. 3 is another schematic structural diagram of an electronic key 10 according to an embodiment of the present disclosure.

As shown in FIG. 3, the electronic key 10 includes a fingerprint sensor 102 and a time data collector 103. The fingerprint sensor 102 may obtain, when a user presses a sensing area 101 of the electronic key 10 shown in FIG. 1, fingerprint data of the user that triggers an unlock operation.

The time data collector 103 may obtain, when the user presses the sensing area 101 of the electronic key 10 shown in FIG. 1, time data when the unlock operation is triggered.

When the unlock operation is triggered, the electronic key 10 obtains the fingerprint data of the user that triggers the unlock operation and time data. Then the electronic key 10 encrypts the fingerprint data and the obtained time data when the unlock operation is triggered, to obtain encrypted data.

Correspondingly, after receiving the encrypted data in which the fingerprint data and the time data are encrypted, an electronic lock 30 performs decryption according to a decryption algorithm corresponding to an algorithm used in the encryption process of the electronic key 10. If the decryption is successful, the fingerprint data of the user that triggers the unlock operation and the time data when the unlock operation is triggered are obtained.

Figure 4:
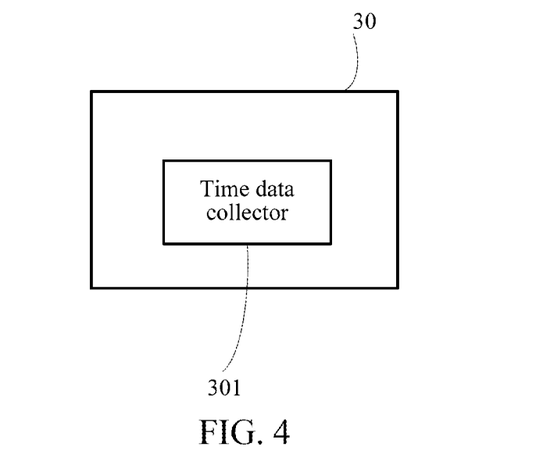
FIG. 4 is a schematic structural diagram of an electronic lock according to an embodiment of the present disclosure.

The electronic lock 30 also includes a time data collector. As shown in FIG. 4, the electronic lock 30 includes a time data collector 301. When receiving encrypted data, the time data collector 301 determines time when the encrypted data is received.

After the decryption is successful, the electronic lock 30 matches the fingerprint data of the user that triggers the unlock operation against the prestored fingerprint data, and matches the time data when the unlock operation is triggered against the time data collected by the electronic lock when receiving the encrypted data.

The fingerprint data matching is successful, when a similarity between the fingerprint data of the user that triggers the unlock operation and the prestored user fingerprint data is greater than a first preset threshold.

The time data matching is successful, when a difference between the time data when the unlock operation is triggered and the time data when the electronic lock receives the encrypted data is less than a second preset threshold.

When both the fingerprint data matching and the time data matching are successful, it is considered that the matching is successful, and the unlock operation is executed.

Reference may be made to some of the descriptions of FIG. 2 for understanding of the process and example of the fingerprint data matching.

The process of the time data matching is as follows. For example, after the decryption, the obtained time when the unlock operation is triggered is 10:20:31, the time collected when the encrypted data is received is 10:20:32, and the second preset threshold, for example, may be 5 seconds. Then in this example, the difference between the time when the unlock operation is triggered and the time collected by the electronic lock when receiving the encrypted data is 1 second, and it may be confirmed that the time data matching is successful. When the fingerprint data matching is also successful, it is considered that the unlock condition is reached, and the electronic lock executes the unlock operation.

Figure 5:
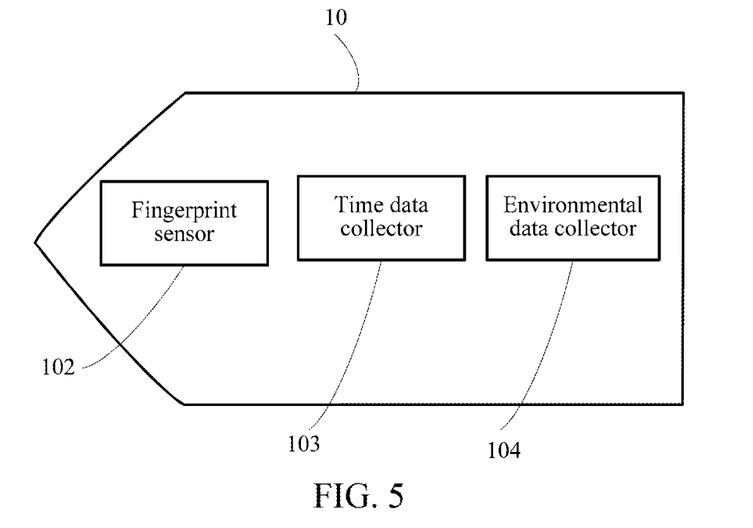
FIG. 5 is another schematic structural diagram of an electronic key according to an embodiment of the present disclosure.

FIG. 5 is another schematic structural diagram of an electronic key 10 according to an embodiment of the present disclosure.

As shown in FIG. 5, the electronic key 10 includes a fingerprint sensor 102, a time data collector 103, and an environmental data collector 104. The environmental data collector 104 may include a temperature data collector, a humidity data collector, and the like.

The fingerprint sensor 102 may obtain, when a user presses the sensing area 101 of the electronic key 10 shown in FIG. 1, fingerprint data of the user that triggers the unlock operation.

The time data collector 103 may obtain, when the user presses the sensing area 101 of the electronic key 10 shown in FIG. 1, time data when the unlock operation is triggered.

The environmental data collector 104 may obtain, when the user presses the sensing area 101 of the electronic key 10 shown in FIG. 1, environmental data when the unlock operation is triggered. For example, the environmental data collector 104 may obtain at least one of temperature data or humidity data. For example, the environmental data collector 104 obtains the temperature data. For example, the environmental data collector 104 obtains that the temperature when the unlock operation is triggered is 26.1 degrees centigrade.

When the unlock operation is triggered, the electronic key 10 obtains the fingerprint data of the user that triggers the unlock operation, the time data, and the environmental data. Then the electronic key 10 encrypts the fingerprint data, the time data, and the environmental data, to obtain encrypted data.

Correspondingly, after receiving the encrypted data in which the fingerprint data, the time data, and the environmental data are encrypted, an electronic lock 30 performs decryption according to a decryption algorithm corresponding to an algorithm used in the encryption process of the electronic key 10. If the decryption is successful, the fingerprint data of the user that triggers the unlock operation, the time data, and the environmental data are obtained.

Figure 6:
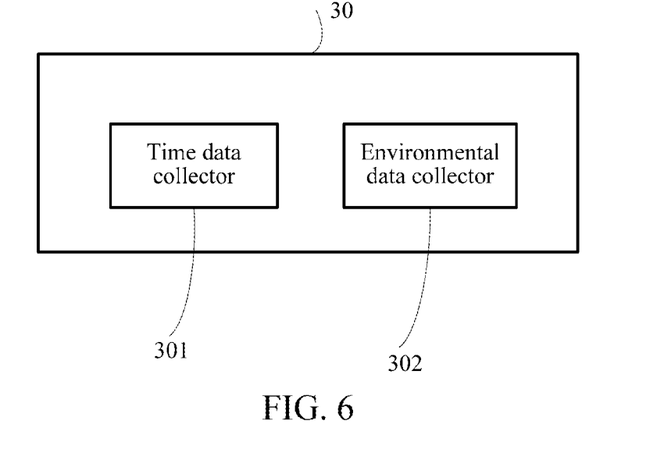
FIG. 6 is a schematic structural diagram of an electronic lock according to an embodiment of the present disclosure.

The electronic lock 30 also includes an environmental data collector. As shown in FIG. 6, the electronic lock 30 includes an environmental data collector 302. After the encrypted data is received, the environmental data collector 302 collects and receives the environmental data of the encrypted data, such as at least one of temperature or humidity.

After the decryption is successful, the electronic lock 30 matches the fingerprint data of the user that triggers the unlock operation against the prestored fingerprint data, matches the time data when the unlock operation is triggered against the time data collected by the electronic lock when receiving the encrypted data, and matches the environmental data when the unlock operation is triggered against the environmental data collected by the electronic lock when receiving the encrypted data.

The fingerprint data matching is successful, when a similarity between the fingerprint data of the user that triggers the unlock operation and the prestored user fingerprint data is greater than a first preset threshold.

The time data matching is successful, when a difference between the time data when the unlock operation is triggered and the time data when the electronic lock receives the encrypted data is less than a second preset threshold.

The environmental data matching is successful, when a difference between the environmental data when the unlock operation is triggered and the environmental data collected by the electronic lock when receiving the encrypted data is less than a third preset threshold.

Reference may be made to some of the exemplary descriptions of FIG. 2 and FIG. 4 for understanding of both the processes of the fingerprint data matching and the time data matching. For example, the environmental data matching process is a temperature data matching process. After the decryption, the obtained temperature data when the unlock operation is triggered is 26.1 degrees centigrade, the temperature data collected when the encrypted data is received is 26.2 degrees centigrade, and the third preset threshold, for example, may be 1 degree centigrade. Then in this example, the difference between the temperature data when the unlock operation is triggered and the temperature data collected by the electronic lock when receiving the encrypted data is 0.1 degree centigrade, which is less than the third preset threshold, and it may be confirmed that the temperature data matching is successful. The principle of humidity data is the same as that of temperature data, and reference may be made to the process of temperature data matching for understanding.

When the fingerprint data matching, the time data matching, and the environmental data matching are all successful, it may be considered that the matching is successful, and the electronic lock may execute the unlock operation.

Unlocking by using only fingerprint data, unlocking by using a combination of the fingerprint data and time data, and unlocking by using a combination of the fingerprint data, the time data, and environmental data are described above. Actually, unlocking by using a combination of the fingerprint data and the environmental data may further be included. The principles of unlocking are all the same as above, and are not listed one by one in this embodiment of the present disclosure.

Compared with poor security of unlocking by using an electronic key in the related technology, in the electronic unlocking system provided in this embodiment of the present disclosure, in the unlock process, not only decryption needs to be first performed, but also at least one piece of decrypted feature data needs to match, so that the unlock operation is executed, thereby improving the security of unlocking by using the electronic key.

Figure 7:
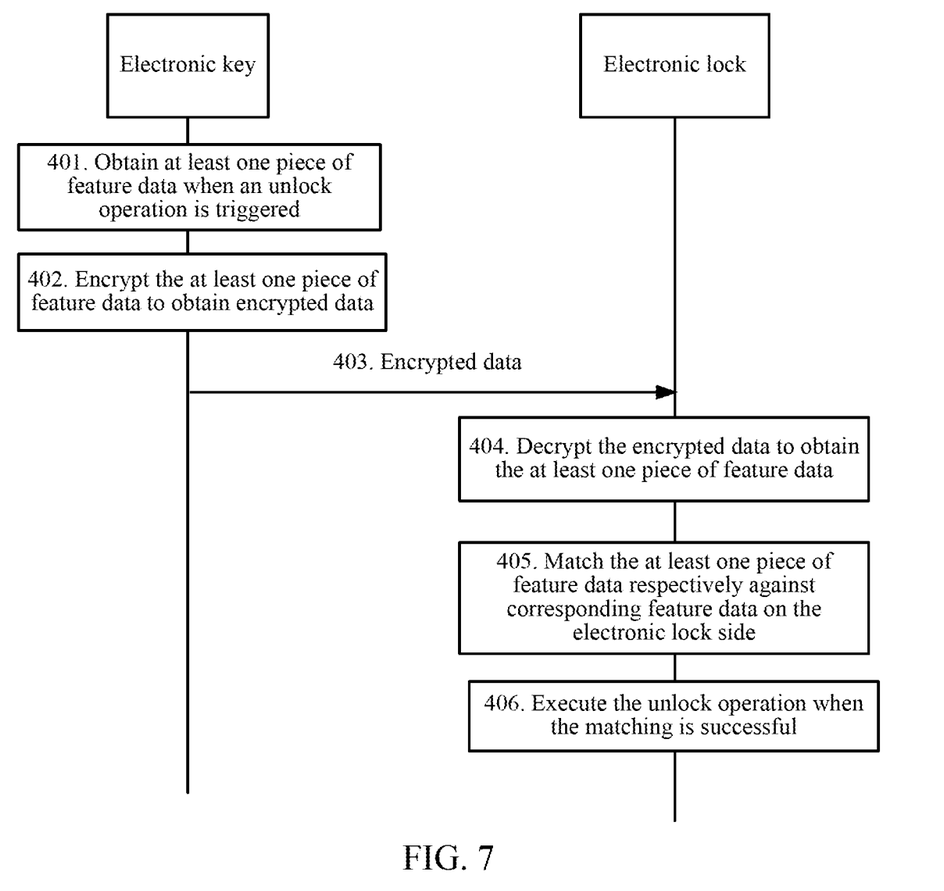
FIG. 7 is a schematic diagram of an embodiment of a data processing method according to an embodiment of the present disclosure.

FIG. 7 is a schematic diagram of an embodiment of a data processing method according to an embodiment of the present disclosure.

As shown in FIG. 7, an embodiment of the data processing method provided in this embodiment of the present disclosure includes:

In step 401, an electronic key obtains at least one piece of feature data when an unlock operation is triggered. The at least one piece of feature data includes data for representing a user that triggers the unlock operation.

In step 402, the electronic key encrypts the at least one piece of feature data to obtain encrypted data.

In step 403, the electronic key sends the encrypted data to the electronic lock.

In step 404, after receiving the encrypted data sent by the electronic key, the electronic lock decrypts the encrypted data, to obtain at least one piece of decrypted feature data.

In step 405, the electronic lock matches the at least one piece of decrypted feature data against corresponding feature data on the electronic lock side.

In step 406, the electronic lock executes the unlock operation when the matching is successful.

Compared with poor security of unlocking by using an electronic key in the related technology, according to the data processing method provided in the embodiments of the present disclosure, in the unlock process, not only decryption needs to be first performed, but also at least one piece of decrypted feature data needs to match, so that the unlock operation is executed, thereby improving the security of unlocking by using the electronic key.

Optionally, the electronic key includes a fingerprint sensor, and the obtaining, by the electronic key, at least one piece of feature data when an unlock operation is triggered may include:

obtaining, by the electronic key by using the fingerprint sensor, fingerprint data of the user that triggers the unlock operation.

Correspondingly, the at least one piece of feature data includes fingerprint data of a user that triggers the unlock operation.

The matching, by the electronic lock, the at least one piece of decrypted feature data respectively against corresponding feature data on the electronic lock side may include:

matching, by the electronic lock, the fingerprint data of the user that triggers the unlock operation against user fingerprint data prestored on the electronic lock side;

determining that fingerprint data matching is successful, when a similarity between the fingerprint data of the user that triggers the unlock operation and the prestored user fingerprint data is greater than a first preset threshold; and the executing, by the electronic lock, the unlock operation when the matching is successful may include:

executing, by the electronic lock, the unlock operation when the fingerprint data matching is successful.

Reference may be made to some of the descriptions and exemplary descriptions of the electronic key and the electronic lock of FIG. 2 for the process in this embodiment of the present disclosure. Details are not described herein again.

Optionally, the electronic key further includes a time data collector, and during the obtaining, by the electronic key by using the fingerprint sensor, fingerprint data of the user that triggers the unlock operation, the method may further include:

obtaining, by the electronic key by using the time data collector, time data when the unlock operation is triggered.

Correspondingly, the at least one piece of feature data further includes time data when the unlock operation is triggered; during the matching, by the electronic lock, the fingerprint data of the user that triggers the unlock operation against user fingerprint data prestored on the electronic lock side, the method may further include:

matching, by the electronic lock, the time data when the unlock operation is triggered against time data when the electronic lock receives the encrypted data; and determining that time data matching is successful, when a difference between the time data when the unlock operation is triggered and the time data when the electronic lock receives the encrypted data is less than a second preset threshold; and the executing, by the electronic lock, the unlock operation when the fingerprint data matching is successful may include:

executing, by the electronic lock, the unlock operation when both the fingerprint data matching and the time data matching are successful.

Reference may be made to some of the descriptions and exemplary descriptions of the electronic key and the electronic lock of FIG. 3 and FIG. 4 for the process in this embodiment of the present disclosure. Details are not described herein again.

Optionally, the electronic key further includes an environmental data collector, and during the obtaining, by the electronic key by using the fingerprint sensor, fingerprint data of the user that triggers the unlock operation, the method may further include:

obtaining, by the electronic key by using the environmental data collector, environmental data when the unlock operation is triggered.

Correspondingly, the at least one piece of feature data further includes environmental data when the unlock operation is triggered;

during the matching, by the electronic lock, the fingerprint data of the user that triggers the unlock operation against user fingerprint data prestored on the electronic lock side, the method may further include:

matching, by the electronic lock, the environmental data when the unlock operation is triggered against environmental data collected by the electronic lock when receiving the encrypted data; and determining that environmental data matching is successful, when a difference between the environmental data when the unlock operation is triggered and the environmental data collected by the electronic lock when receiving the encrypted data is less than a third preset threshold; and the executing, by the electronic lock, the unlock operation when the fingerprint data matching is successful may include:

executing, by the electronic lock, the unlock operation when both the fingerprint data matching and the environmental data matching are successful, or, executing, by the electronic lock, the unlock operation when the fingerprint data matching, the time data matching, and the environmental data matching are all successful.

Reference may be made to some of the descriptions and exemplary descriptions of the electronic key and the electronic lock of FIG. 5 and FIG. 6 for the process in this embodiment of the present disclosure. Details are not described herein again.

The electronic unlocking system and the data processing method are described above. The electronic key and the electronic lock in the embodiments of the present disclosure are described below with reference to the accompanying drawings.

Figure 8:
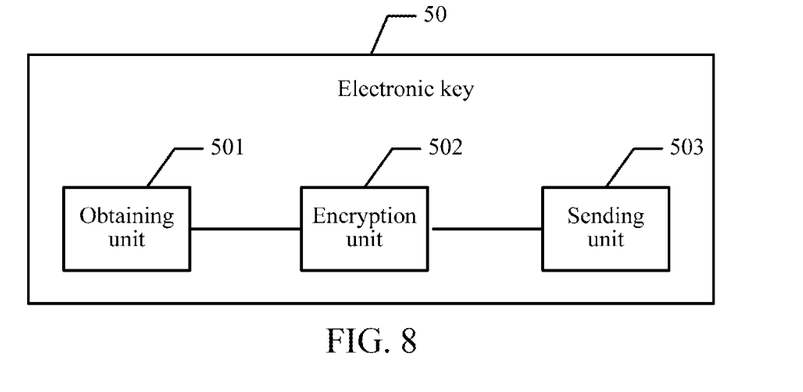
FIG. 8 is a schematic diagram of an embodiment of an electronic key according to an embodiment of the present disclosure.

FIG. 8 is a schematic diagram of an embodiment of an electronic key according to an embodiment of the present disclosure.

As shown in FIG. 8, an electronic key 50 provided in this embodiment of the present disclosure is applied to an electronic unlocking system, the electronic unlocking system further including an electronic lock, the electronic lock and the electronic key being communicatively connected to each other, and the electronic key 50 including:

an obtaining unit 501, configured to obtain at least one piece of feature data when an unlock operation is triggered, the at least one piece of feature data including data for representing a user that triggers the unlock operation;

an encryption unit 502, configured to encrypt the at least one piece of feature data obtained by the obtaining unit 501 to obtain encrypted data; and a sending unit 503, configured to send the encrypted data encrypted by the encryption unit 502 to the electronic lock, so that the electronic lock decrypts the encrypted data to obtain at least one piece of decrypted feature data.

In this embodiment of the present disclosure, the obtaining unit 501 obtains at least one piece of feature data when an unlock operation is triggered, the at least one piece of feature data including data for representing a user that triggers the unlock operation; the encryption unit 502 encrypts the at least one piece of feature data obtained by the obtaining unit 501 to obtain encrypted data; and the sending unit 503 sends the encrypted data encrypted by the encryption unit 502 to the electronic lock, so that the electronic lock decrypts the encrypted data to obtain at least one piece of decrypted feature data. Compared with poor security of unlocking by using an electronic key in the related technology, the electronic key provided in this embodiment of the present disclosure may encrypt, in the unlock process, at least one piece of feature data, and then send obtained encrypted data to an electronic lock; not only the electronic lock needs to first perform decryption, but also at least one piece of decrypted feature data needs to match, so that the unlock operation is executed, thereby improving the security of unlocking by using the electronic key.

Figure 9:
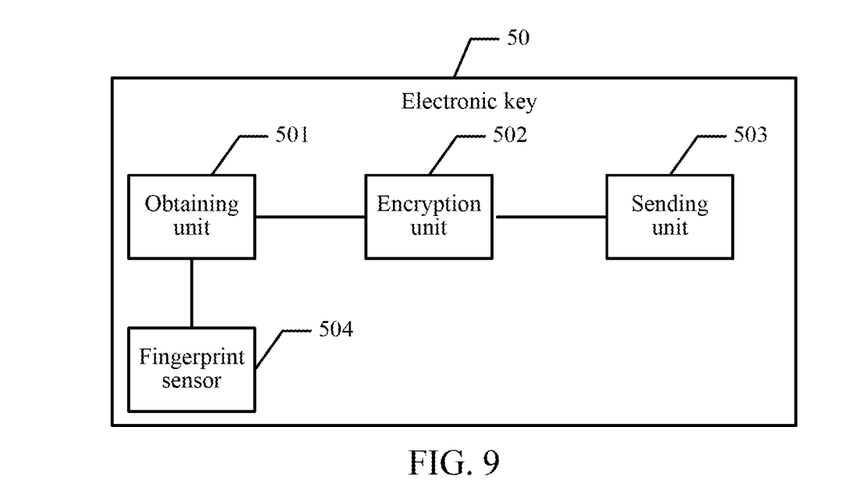
FIG. 9 is a schematic diagram of another embodiment of an electronic key according to an embodiment of the present disclosure.

Optionally, referring to FIG. 9, in another embodiment of the electronic key 50 provided in this embodiment of the present disclosure, the electronic key 50 further includes a fingerprint sensor 504, and the obtaining unit 501 is configured to obtain fingerprint data, which is collected by the fingerprint sensor 504, of the user that triggers the unlock operation.

Figure 10:
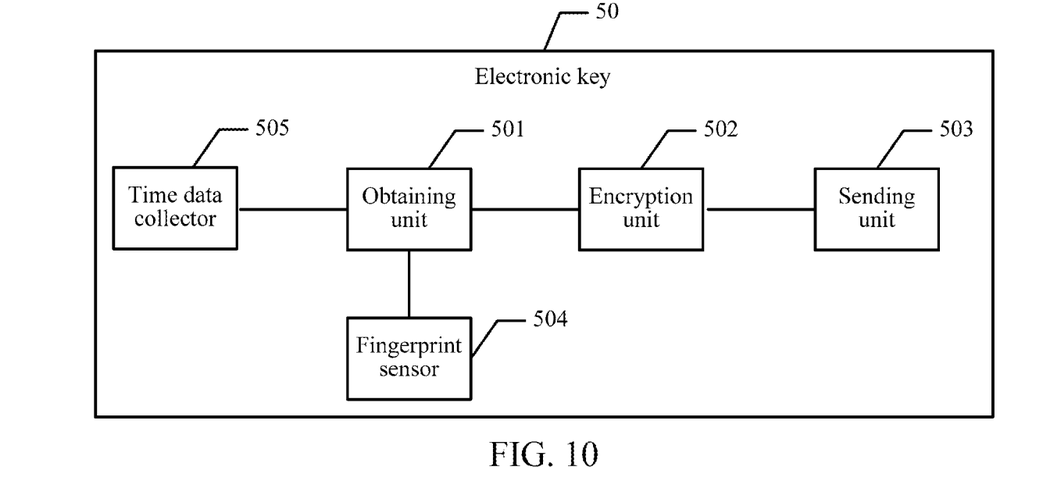
FIG. 10 is a schematic diagram of another embodiment of an electronic key according to an embodiment of the present disclosure.

Optionally, referring to FIG. 10, in another embodiment of the electronic key 50 provided in this embodiment of the present disclosure, the electronic key further includes a time data collector 505, and the obtaining unit 501 is configured to obtain time data that is determined by the time data collector 505 when the unlock operation is triggered.

Figure 11:
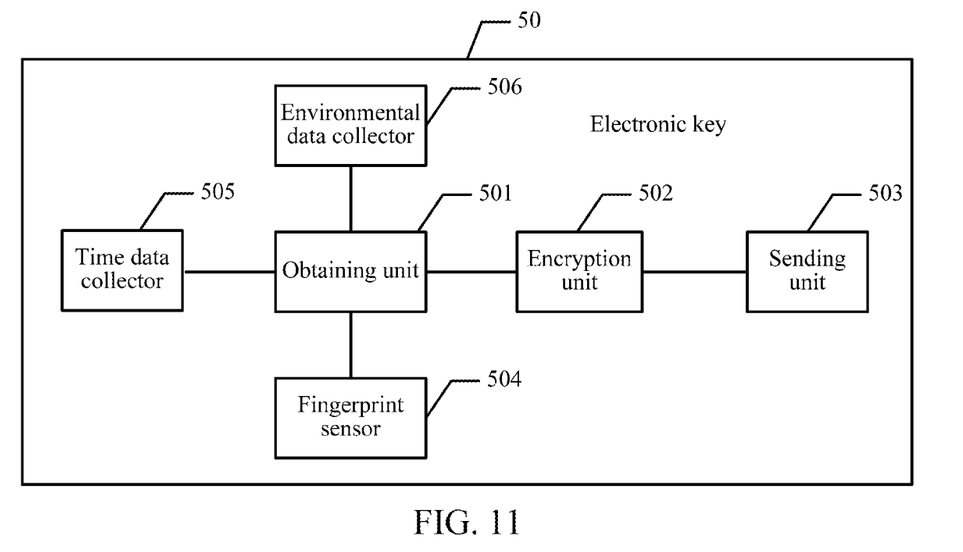
FIG. 11 is a schematic diagram of another embodiment of an electronic key according to an embodiment of the present disclosure.

Optionally, referring to FIG. 11, in another embodiment of the electronic key 50 provided in this embodiment of the present disclosure, the electronic key further includes an environmental data collector 506, and the obtaining unit is configured to obtain environmental data that is collected by the environmental data collector when the unlock operation is triggered.

Reference may be made to the part of the description of the electronic key of FIG. 1 to FIG. 6 for understanding of the electronic key 50 described above. Details are not described herein again.

Figure 12:
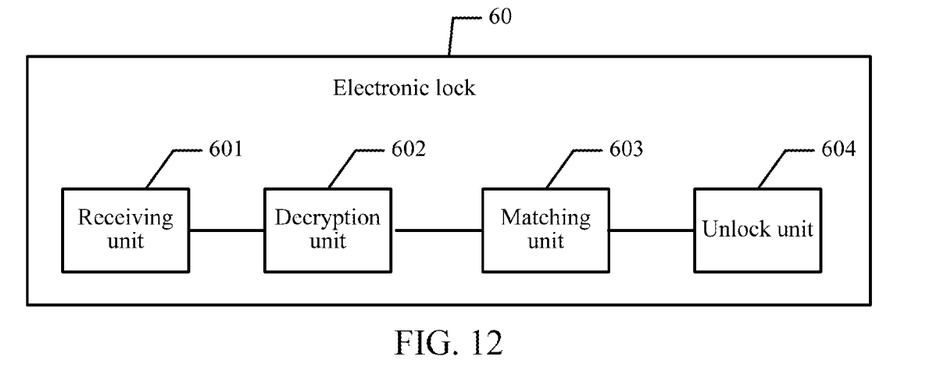
FIG. 12 is a schematic diagram of an embodiment of an electronic lock according to an embodiment of the present disclosure.

Referring to FIG. 12, an electronic lock 60 provided in this embodiment of the present disclosure is applied to an electronic unlocking system, the electronic unlocking system further including an electronic key, the electronic lock and the electronic key being communicatively connected to each other, and the electronic lock 60 including:

a receiving unit 601, configured to receive encrypted data sent by the electronic key, the encrypted data being obtained by the electronic key by encrypting at least one piece of feature data obtained when an unlock operation is triggered, and the at least one piece of feature data including data for representing a user that triggers the unlock operation;

a decryption unit 602, configured to decrypt the encrypted data received by the receiving unit 601 to obtain at least one piece of decrypted feature data;

a matching unit 603, configured to match the at least one piece of decrypted feature data against corresponding feature data on the electronic lock side; and an unlock unit 604, configured to execute the unlock operation when the matching performed by the matching unit 603 is successful.

In this embodiment of the present disclosure, the receiving unit 601 receives encrypted data sent by the electronic key. The encrypted data is obtained by the electronic key by encrypting at least one piece of feature data obtained when an unlock operation is triggered, and the at least one piece of feature data includes data for representing a user that triggers the unlock operation. The decryption unit 602 decrypts the encrypted data received by the receiving unit 601 to obtain at least one piece of decrypted feature data. The matching unit 603 matches the at least one piece of decrypted feature data against corresponding feature data on the electronic lock side. The unlock unit 604 executes the unlock operation when the matching performed by the matching unit 603 is successful. Compared with poor security of unlocking by using an electronic key in the related technology, not only the electronic lock provided in this embodiment of the present disclosure needs to first perform decryption, but also at least one piece of decrypted feature data needs to match, so that the unlock operation is executed, thereby improving the security of unlocking by using the electronic key.

Optionally, the at least one piece of feature data includes fingerprint data of a user that triggers the unlock operation. In this case, the matching unit 603 is configured to match the fingerprint data of the user that triggers the unlock operation against user fingerprint data prestored on the electronic lock side; and determine that fingerprint data matching is successful, when a similarity between the fingerprint data of the user that triggers the unlock operation and the prestored user fingerprint data is greater than a first preset threshold. The unlock unit 604 is configured to execute the unlock operation when the fingerprint data matching is successful.

Optionally, the at least one piece of feature data may further include time data when the unlock operation is triggered. In this case, the matching unit 603 is further configured to match the time data when the unlock operation is triggered against time data when the electronic lock receives the encrypted data; and determine that time data matching is successful, when a difference between the time data when the unlock operation is triggered and the time data when the electronic lock receives the encrypted data is less than a second preset threshold. The unlock unit 604 is configured to execute the unlock operation when both the fingerprint data matching and the time data matching are successful.

Optionally, the at least one piece of feature data may further include environmental data when the unlock operation is triggered. In this case, the matching unit 603 is configured to match the environmental data when the unlock operation is triggered against environmental data collected by the electronic lock when receiving the encrypted data; and determine that environmental data matching is successful, when a difference between the environmental data when the unlock operation is triggered and the environmental data collected by the electronic lock when receiving the encrypted data is less than a third preset threshold. The unlock unit 604 is configured to execute, by the electronic lock, the unlock operation when both the fingerprint data matching and the environmental data matching are successful, or, execute, by the electronic lock, the unlock operation when the fingerprint data matching, the time data matching, and the environmental data matching are all successful.

Figure 13:
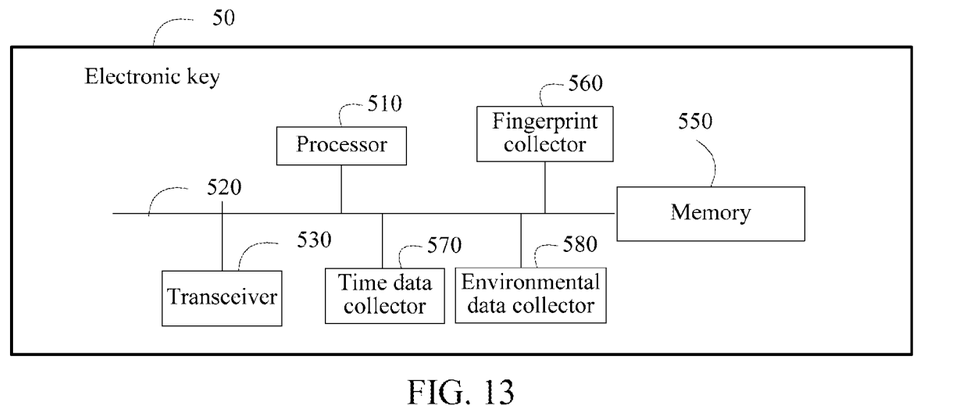
FIG. 13 is a schematic diagram of another embodiment of an electronic key according to an embodiment of the present disclosure.

FIG. 13 is a schematic structural diagram of an electronic key 50 according to an embodiment of the present disclosure. The electronic key 50 is applied to an electronic unlocking system. The electronic unlocking system further includes an electronic lock, the electronic lock and the electronic key being communicatively connected to each other. The electronic key 50 includes a processor 510 (or other circuitry), a fingerprint collector 560, a time data collector 570, an environmental data collector 580, a memory 550, and a transceiver 530. The fingerprint collector 560 may be configured to collect a fingerprint of a user that triggers an unlock operation. The time data collector 570 may be configured to determine time when the unlock operation is triggered. The environmental data collector 580 may be configured to collect environmental data when the unlock operation is triggered. The memory 550 may include a read only memory (ROM) and a random access memory (RAM), and provides operating instructions and data to the processor 510. A part of the memory 550 may further include a non-volatile random access memory (NVRAM).

In some implementations, the memory 550 stores the following elements: an executable module, a data structure, a subset thereof, or an extension set thereof.

In this embodiment of the present disclosure, by invoking the operating instructions (the operating instructions may be stored in an operating system) stored in the memory 550, at least one piece of feature data is obtained when an unlock operation is triggered, the at least one piece of feature data including data for representing a user that triggers the unlock operation;

the at least one piece of feature data is encrypted to obtain encrypted data; and the encrypted data is sent to the electronic lock by using a transceiver 530, so that the electronic lock decrypts the encrypted data to obtain at least one piece of decrypted feature data.

Compared with poor security of unlocking by using an electronic key in the related technology, the electronic key provided in this embodiment of the present disclosure may encrypt, in the unlock process, at least one piece of feature data, and then send obtained encrypted data to an electronic lock. Not only the electronic lock needs to first perform decryption, but also at least one piece of decrypted feature data needs to match, so that the unlock operation is performed, thereby improving the security of unlocking by using the electronic key.

The processor 510 controls an operation of the electronic key 50, and the processor 510 may also be referred to as a central processing unit (CPU). The memory 550 may include a ROM and a RAM, and provides instructions and data to the processor 510. A part of the memory 550 may further include an NVRAM. In specific application, components of the electronic key 50 are coupled by using a bus system 520, and besides a data bus, the bus system 520 may further include a power source bus, a control bus, a state signal bus, and the like. However, for clear description, in the figure, all buses are marked as the bus system 520.

The method disclosed in the foregoing embodiments of the present disclosure may be applied to the processor 510, or may be implemented by the processor 510. The processor 510 may be an integrated circuit chip, having a capability of processing a signal. In an implementation process, steps of the foregoing methods may be completed by using an integrated logical circuit of hardware in the processor 510 or an instruction in a form of software. The processor 510 may be a general purpose processor, a digital signal processor (DSP), an application-specific integrated circuit (ASIC), a field programmable gate array (FPGA) or another programmable logic device, a discrete gate or a transistor logic device, or a discrete hardware assembly. The processor 510 may implement or perform methods, steps, and logical block diagrams disclosed in the embodiments of the present disclosure. The general purpose processor may be a microprocessor, any regular processor, or the like. The steps of the methods disclosed in the embodiments of the present disclosure may be directly implemented by a hardware decoding processor, or may be implemented by combining hardware and software modules in a decoding processor. A software module may be located in a storage medium in the art, such as a RAM, a flash memory, a ROM, a programmable ROM, an electrical erasable programmable memory, or a register. The storage medium is located in the memory 550, and the processor 510 reads information in the memory 550 and completes the steps of the foregoing methods in combination with hardware thereof.

Optionally, the processor 510 is configured to obtain, by using the fingerprint sensor, fingerprint data of the user that triggers the unlock operation.

Optionally, the processor 510 is configured to determine, by using the time data collector, time when the unlock operation is triggered.

Optionally, the processor 510 is configured to obtain, by using the environmental data collector, environmental data when the unlock operation is triggered.

Reference may be made to some of the descriptions of FIG. 1 to FIG. 6 for understanding of the foregoing electronic key 50. Details are not described herein again.

Figure 14:
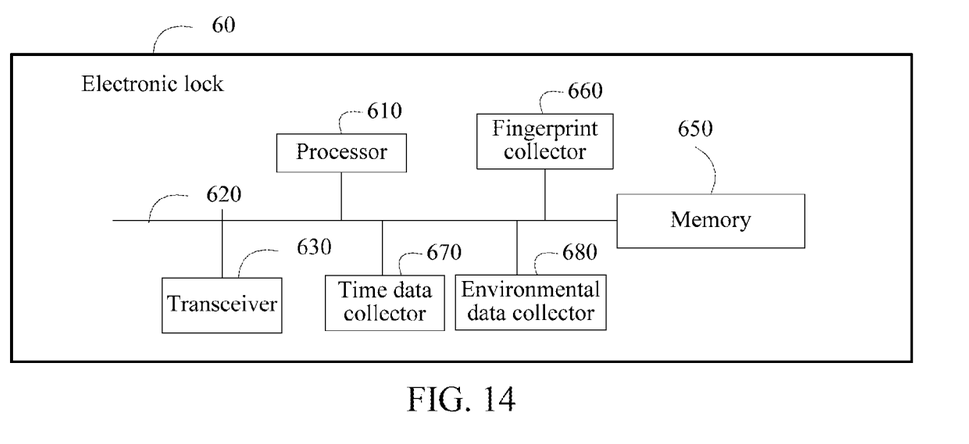
FIG. 14 is a schematic diagram of another embodiment of an electronic lock according to an embodiment of the present disclosure.

FIG. 14 is a schematic structural diagram of an electronic lock 60 according to an embodiment of the present disclosure. The electronic lock 60 is applied to an electronic unlocking system. The electronic unlocking system further includes an electronic lock, the electronic lock and the electronic key being wirelessly communicatively connected to each other. The electronic lock includes a processor 610, a fingerprint collector 660, a time data collector 670, an environmental data collector 680, a memory 650, and a transceiver 630. The fingerprint collector 660 may be configured to collect a prestored fingerprint. The time data collector 670 may be configured to determine time data when the electronic lock receives the encrypted data. The environmental data collector 680 may be configured to collect environmental data collected by electronic lock when receiving the encrypted data. The memory 650 may include a ROM and a RAM, and provides operating instructions and data to the processor 610. A part of the memory 650 may further include an NVRAM.

In some implementations, the memory 650 stores the following elements: an executable module, a data structure, a subset thereof, or an extension set thereof.

In this embodiment of the present disclosure, by invoking the operating instructions (the operating instructions may be stored in an operating system) stored in the memory 650, encrypted data sent by the electronic key is received by using the transceiver 630, the encrypted data being obtained by the electronic key by encrypting at least one piece of feature data obtained when an unlock operation is triggered, and the at least one piece of feature data including data for representing a user that triggers the unlock operation;

the encrypted data is decrypted to obtain at least one piece of decrypted feature data;

the at least one piece of decrypted feature data is matched against corresponding feature data on the electronic lock side; and the unlock operation is executed when the matching is successful.

Compared with poor security of unlocking by using an electronic key in the related technology, not only the electronic lock provided in this embodiment of the present disclosure needs to first perform decryption, but also at least one piece of decrypted feature data needs to match, so that the unlock operation is executed, thereby improving the security of unlocking by using the electronic key.

The processor 610 controls an operation of the electronic lock 60, and the processor 610 may also be referred to as a CPU. The memory 650 may include a ROM and a RAM, and provides instructions and data to the processor 610. A part of the memory 650 may further include an NVRAM. In specific application, components of the electronic lock 60 are coupled by using a bus system 620, and besides a data bus, the bus system 620 may further include a power source bus, a control bus, a state signal bus, and the like. However, for clear description, in the figure, all buses are marked as the bus system 620.

The method disclosed in the foregoing embodiments of the present disclosure may be applied to the processor 610, or may be implemented by the processor 610. The processor 610 may be an integrated circuit chip, having a capability of processing a signal. In an implementation process, steps of the foregoing methods may be completed by using an integrated logical circuit of hardware in the processor 610 or an instruction in a form of software. The processor 610 may be a general purpose processor, a DSP, an ASIC, an FPGA or another programmable logic device, a discrete gate or a transistor logic device, or a discrete hardware assembly. The processor 610 may implement or perform methods, steps, and logical block diagrams disclosed in the embodiments of the present disclosure. The general purpose processor may be a microprocessor, any regular processor, or the like. The steps of the methods disclosed in the embodiments of the present disclosure may be directly implemented by a hardware decoding processor, or may be implemented by combining hardware and software modules in a decoding processor. A software module may be located in a mature storage medium in the art, such as a RAM, a flash memory, a ROM, a programmable ROM, an electrical erasable programmable memory, or a register. The storage medium is located in the memory 650, and the processor 610 reads information in the memory 650 and completes the steps of the foregoing methods in combination with hardware thereof.

Optionally, the processor 610 is configured to: when at least one piece of feature data includes fingerprint data of the user that triggers the unlock operation, match the fingerprint data of the user that triggers the unlock operation against user fingerprint data prestored on the electronic lock side; determine that fingerprint data matching is successful, when a similarity between the fingerprint data of the user that triggers the unlock operation and the prestored user fingerprint data is greater than a first preset threshold; and execute the unlock operation when the fingerprint data matching is successful.

Optionally, the processor 610 is configured to: when the at least one piece of feature data further includes time data when the unlock operation is triggered, match the time data when the unlock operation is triggered against time data when the electronic lock receives the encrypted data; and determine that time data matching is successful, when a difference between the time data when the unlock operation is triggered and the time data collected by the electronic lock when receiving the encrypted data is less than a second preset threshold; and execute the unlock operation when both the fingerprint data matching and the time data matching are successful.

Optionally, the processor 610 is configured to: when the at least one piece of feature data further includes environmental data when the unlock operation is triggered, match the environmental data when the unlock operation is triggered against environmental data collected by the electronic lock when receiving the encrypted data; and determine that environmental data matching is successful, when a difference between the environmental data when the unlock operation is triggered and the environmental data collected by the electronic lock when receiving the encrypted data is less than a third preset threshold; and execute the unlock operation when both the fingerprint data matching and the environmental data matching are successful, or, execute, by the electronic lock, the unlock operation when the fingerprint data matching, the time data matching, and the environmental data matching are all successful.

Reference may be made to some of the descriptions of FIG. 1 to FIG. 6 for understanding of the foregoing electronic lock 60. Details are not described herein again.

A person of ordinary skill in the art may understand that all or some of the steps of the methods in the embodiments may be implemented by a program instructing relevant hardware. The program may be stored in a computer readable storage medium (e.g., a non-transitory computer-readable storage medium). The storage medium may include a ROM, a RAM, a magnetic disk, an optical disc, or the like.

The data processing method and device, and the system that are provided in the embodiments of the present disclosure are described in detail above. Principles and implementations of the present disclosure have been explained herein with reference to specific examples. The embodiments are described only to help understand the method and core thought of the present disclosure. Moreover, a person with ordinary skills in the art may make variations in specific implementations and the application scope based on thoughts of the present disclosure. In conclusion, content of this specification should not be considered as a limitation to the present disclosure.

What is claimed is:

1. An electronic key, comprising:
   processing circuitry configured to
     obtain at least one piece of feature data when an unlock operation is triggered, the at least one piece of feature data including data representing a user that triggers the unlock operation and current environmental data that is detected when the user triggers the unlock operation, and
     encrypt the obtained at least one piece of feature data to obtain encrypted data; and
   transmission circuitry configured to send the encrypted data to an electronic lock to cause the electronic lock to execute the unlock operation, wherein
   the unlock operation is executed based on (i) the data representing the user and (ii) a preset threshold being greater than an absolute value of a difference between the current environmental data that is detected when the user triggers the unlock operation and second environmental data that is generated by the electronic lock when the encrypted data is received, and
   the current environmental data and the second environmental data are temperature data or humidity data.

2. The electronic key according to claim 1, further comprising:
   a fingerprint sensor, wherein
   the processing circuitry is configured to obtain, from the fingerprint sensor, fingerprint data of the user that triggers the unlock operation, and
   the data representing the user includes the fingerprint data.

3. The electronic key according to claim 2, wherein the at least one piece of feature data further indicates current time information associated with when the unlock operation is triggered.

4. The electronic key according to claim 2, further comprising:
   an environmental sensor, wherein
   the processing circuitry is configured to obtain, from the environmental sensor, the current environmental data associated with when the unlock operation is triggered.

5. The electronic key according to claim 4, wherein
   the environmental sensor is a temperature sensor, and
   the current environmental data is the temperature data corresponding to a temperature detected by the temperature sensor.

6. The electronic key according to claim 4, wherein
   the environmental sensor is a humidity sensor, and
   the current environmental data is the humidity data corresponding to a humidity detected by the humidity sensor.

7. The electronic key according to claim 1, wherein the data representing the user includes biometric information of the user.

8. An electronic lock, comprising:
   receiver circuitry configured to receive encrypted data from an electronic key, the encrypted data including at least one piece of feature data that is obtained by the electronic key when an unlock operation is triggered, and the at least one piece of feature data including data representing a user that triggers the unlock operation and current environmental data that is detected when the unlock operation is triggered; and
   processing circuitry configured to
     generate second environmental data when the encrypted data is received,
     decrypt the received encrypted data to obtain the at least one piece of feature data, and
     execute the unlock operation based on (i) the data representing the user, and (ii) a preset threshold being greater than an absolute value of a difference between the current environmental data that is detected when the unlock operation is triggered and the second environmental data generated when the encrypted data is received,
   wherein the current environmental data and the second environmental data are temperature data or humidity data.

9. The electronic lock according to claim 8, wherein
   the data representing the user includes fingerprint data of the user that triggers the unlock operation;
   the processing circuitry is configured to
     determine whether the fingerprint data of the user that triggers the unlock operation matches prestored user fingerprint data, and
     determine that the fingerprint data matches the prestored user fingerprint data when a similarity between the fingerprint data of the user that triggers the unlock operation and the prestored user fingerprint data is greater than a second threshold; and
   execution of the unlock operation is further based on the fingerprint data being determined to match the prestored user fingerprint data.

10. The electronic lock according to claim 9, wherein
the at least one piece of feature data further indicates current time information associated with when the unlock operation is triggered;
the processing circuitry is configured to determine a difference between a time indicated by the current time information associated with when the unlock operation is triggered and a time associated with when the electronic lock receives the encrypted data; and
execution of the unlock operation is further based on the difference between the time associated with when the unlock operation is triggered and the time associated with when the electronic lock receives the encrypted data being less than or equal to a third threshold.

11. The electronic lock according to claim 9, wherein the processing circuitry is configured to
determine the difference between the current environmental data and the second environmental data.

12. The electronic lock according to claim 10, wherein the processing circuitry is configured to
determine the difference between the current environmental data and the second environmental data; and
execution of the unlock operation is further based on the difference between the time associated with when the unlock operation is triggered and the time associated with when the electronic lock receives the encrypted data being less than or equal to the third threshold.

13. The electronic lock according to claim 11, further comprising:
a temperature sensor, wherein
the second environmental data is the temperature data that is collected by the electronic lock from the temperature sensor.

14. The electronic lock according to claim 11, further comprising:
a humidity sensor, wherein
the second environmental data is the humidity data that is collected by the electronic lock from the humidity sensor.

15. The electronic lock according to claim 8, wherein the data representing the user includes biometric information of the user.

16. The electronic lock according to claim 8, further comprising:
a memory configured to store predetermined feature data that is compared to the data representing the user.

17. An electronic unlocking system, comprising:
an electronic key including
first processing circuitry configured to
obtain at least one piece of feature data when an unlock operation is triggered, the at least one piece of feature data including data of a user that triggers the unlock operation and current environmental data that is detected when the user triggers the unlock operation, and
encrypt the obtained at least one piece of feature data to obtain encrypted data; and
transmission circuitry configured to send the encrypted data to an electronic lock, and
the electronic lock including
receiver circuitry configured to receive the encrypted data from the electronic key;
second processing circuitry configured to
obtain second environmental data that is generated when the encrypted data is received;
decrypt the received encrypted data to obtain the at least one piece of feature data; and
execute the unlock operation based on (i) the data representing the user and (ii) a preset threshold being greater than an absolute value of a difference between the current environmental data that is detected when the user triggers the unlock operation and the second environmental data that is generated when the encrypted data is received,
wherein the current environmental data and the second environmental data are temperature data or humidity data.

18. The electronic unlocking system according to claim 17, wherein the data representing the user that triggers the unlock operation includes biometric information of the user.

19. The electronic unlocking system according to claim 17, wherein the data representing the user that triggers the unlock operation includes fingerprint data of the user.

20. The electronic unlocking system according to claim 17, wherein the electronic key includes a memory that stores predetermined feature data that is compared to the data representing the user.

* * * * *